US012786337B2

(12) United States Patent
Sato

(10) Patent No.: US 12,786,337 B2
(45) Date of Patent: Nov. 3, 2026

(54) INFORMATION PROCESSING APPARATUS, INFORMATION PROCESSING METHOD, AND NON-TRANSITORY COMPUTER READABLE MEDIUM

(71) Applicant: FUJIFILM Business Innovation Corp., Tokyo (JP)

(72) Inventor: Eri Sato, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/455,615

(22) Filed: Aug. 24, 2023

(65) Prior Publication Data

US 2024/0323300 A1 Sep. 26, 2024

(30) Foreign Application Priority Data

Mar. 23, 2023 (JP) ................................ 2023-046340

(51) Int. Cl.
*H04N 1/32* (2006.01)

(52) U.S. Cl.
CPC ..... *H04N 1/32384* (2013.01); *H04N 1/32523* (2013.01)

(58) Field of Classification Search
CPC ....................... H04N 1/32384; H04N 1/32523
See application file for complete search history.

(56) References Cited

U.S. PATENT DOCUMENTS

2021/0211554 A1* 7/2021 Zhang ................ H04N 1/32523

FOREIGN PATENT DOCUMENTS

JP 2012058935 3/2012
JP 2017135561 8/2017

OTHER PUBLICATIONS

NPL: InnovationQ+ by IP.com and IEEE, IPSummaries With Thumbnails-20260501.pdf.*

* cited by examiner

*Primary Examiner* — Quang N Vo
(74) *Attorney, Agent, or Firm* — JCIPRNET

(57) ABSTRACT

An information processing apparatus includes a processor configured to: assign received image data to a person-in-charge in accordance with a predetermined condition, the person-in-charge processing the image data; and transmit information indicating a storage location corresponding to the person-in-charge to a storage destination where the image data is stored if a processable range within a current day is not exceeded as a result of the assigning of the image data to the assigned person-in-charge, and transmit information indicating a storage location corresponding to a second person-in-charge different from the person-in-charge to the storage destination if the range is exceeded, the information indicating the storage location corresponding to the person-in-charge and the information indicating the storage location corresponding to the second person-in-charge each serving as information indicating a storage location in the storage destination when the image data is transferred to the storage destination.

12 Claims, 7 Drawing Sheets

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2023-046340 filed Mar. 23, 2023.

BACKGROUND

(i) Technical Field

The present disclosure relates to information processing apparatuses, information processing methods, and non-transitory computer readable media.

(ii) Related Art

For example, Japanese Unexamined Patent Application Publication No. 2017-135561 discloses a configuration in which, when image data received by a facsimile receiver is to be transferred in accordance with a predetermined condition, a folder serving as a transfer destination is determined by referring to information about the image data, and a folder name of the folder is set as three hierarchical layers including a hierarchical layer of, for example, a date.

SUMMARY

A conceivable case involves assigning received image data to a person-in-charge who processes the image data, transferring the image data to a storage destination where the image data is stored, and causing the person-in-charge to finish processing the image data within the current day once the image data is stored at a storage location corresponding to the assigned person-in-charge. If the processable range within the current day by the person-in-charge to which the received image data is assigned is exceeded as a result of the assignment, an adverse effect caused by a processing delay may occur.

Aspects of non-limiting embodiments of the present disclosure relate to suppressing a processing delay of image data, as compared with a case where received image data is assigned even when the processable range within the current day is exceeded as a result of the assignment.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus comprising a processor configured to: assign received image data to a person-in-charge in accordance with a predetermined condition, the person-in-charge processing the image data; and transmit information indicating a storage location corresponding to the person-in-charge to a storage destination where the image data is stored if a processable range within a current day is not exceeded as a result of the assigning of the image data to the assigned person-in-charge, and transmit information indicating a storage location corresponding to a second person-in-charge different from the person-in-charge to the storage destination if the range is exceeded, the information indicating the storage location corresponding to the person-in-charge and the information indicating the storage location corresponding to the second person-in-charge each serving as information indicating a storage location in the storage destination when the image data is transferred to the storage destination.

BRIEF DESCRIPTION OF THE DRAWINGS

Exemplary embodiments of the present disclosure will be described in detail based on the following figures, wherein.

DETAILED DESCRIPTION

An exemplary embodiment of the present disclosure will be described below with reference to the drawings.

Figure 1:
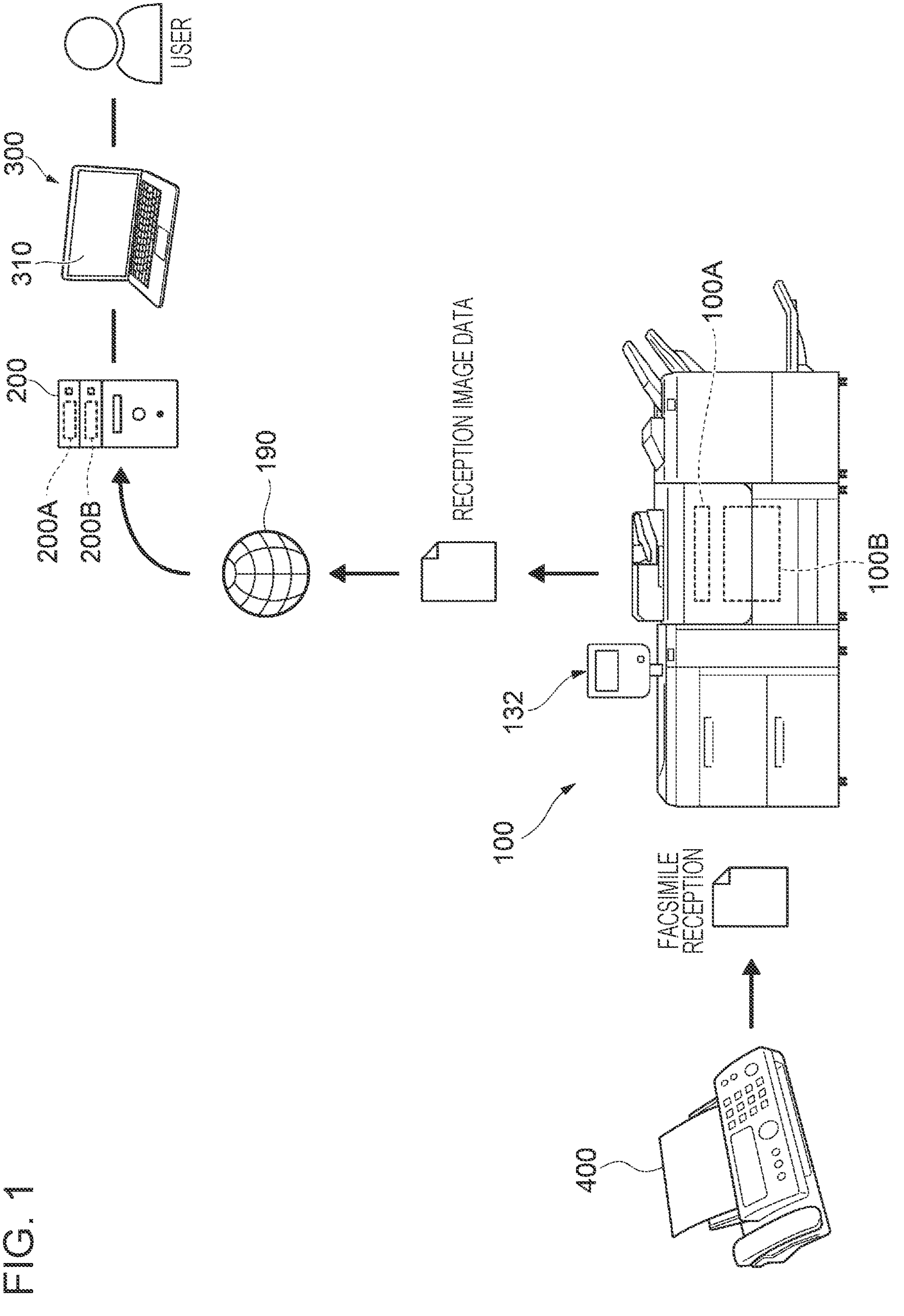
FIG. 1 illustrates an example of an image management system.

FIG. 1 illustrates an example of an image management system 1.

The image management system 1 according to this exemplary embodiment is provided with an image forming apparatus 100 having various functions, such as a copying function, a printing function, a facsimile function, and a scanning function, and a server apparatus 200 connected to the image forming apparatus 100 by a communication line 190. In this exemplary embodiment, the image forming apparatus 100 as an example of an information processing apparatus manages an image received by facsimile. The image is saved in a confidential box included in the image forming apparatus 100, or is transferred to the server apparatus 200 and is managed by being stored at a corresponding storage location. With regard to the image data, the transfer source is the image forming apparatus 100, and the transfer destination is the server apparatus 200.

The image forming apparatus 100 has an operation reception unit 132 operable by a user.

Furthermore, the image management system 1 according to this exemplary embodiment is provided with a user terminal 300 that is connectable to the server apparatus 200 and that receives an operation from the user.

Although a single user terminal 300 is displayed in FIG. 1, multiple user terminals 300 may be provided.

The image forming apparatus 100 is provided with an information processing unit 100A. The information processing unit 100A executes various processes with respect to the image forming apparatus 100. For example, when the image forming apparatus 100 receives image data from a facsimile apparatus 400, the image forming apparatus 100 performs a predetermined process.

The image forming apparatus 100 is also provided with a storage device 100B that stores data. The storage device 100B stores data, such as reception image data received by facsimile or print data to be printed, and may be used as a box, such as a confidential box, created by software. The storage device 100B is realized with, for example, a hard disk drive (HDD). The reception image data is an example of image data.

The image forming apparatus 100 is provided with an image forming unit that forms an image on a sheet as an example of a recording medium by using, for example, the inkjet method or the electrophotography method.

The server apparatus 200 is provided with an information processing unit 200A that executes various processes. The information processing unit 200A executes various processes with respect to the server apparatus 200.

The server apparatus 200 is provided with a storage device 200B that stores data. The storage device 200B may include multiple folders for storing data transferred from the image forming apparatus 100. The folders are created based on a command from the user terminal 300 or a creation request from the information processing unit 200A, and are managed.

The storage device 200B is realized with, for example, an HDD.

The user terminal 300 is provided with a display device 310. The display device 310 is capable of displaying data stored in the storage device 200B of the server apparatus 200.

The user terminal 300 is realized with a computer. Examples of the user terminal 300 include a personal computer (PC), a smartphone, and a tablet terminal.

Figure 2:
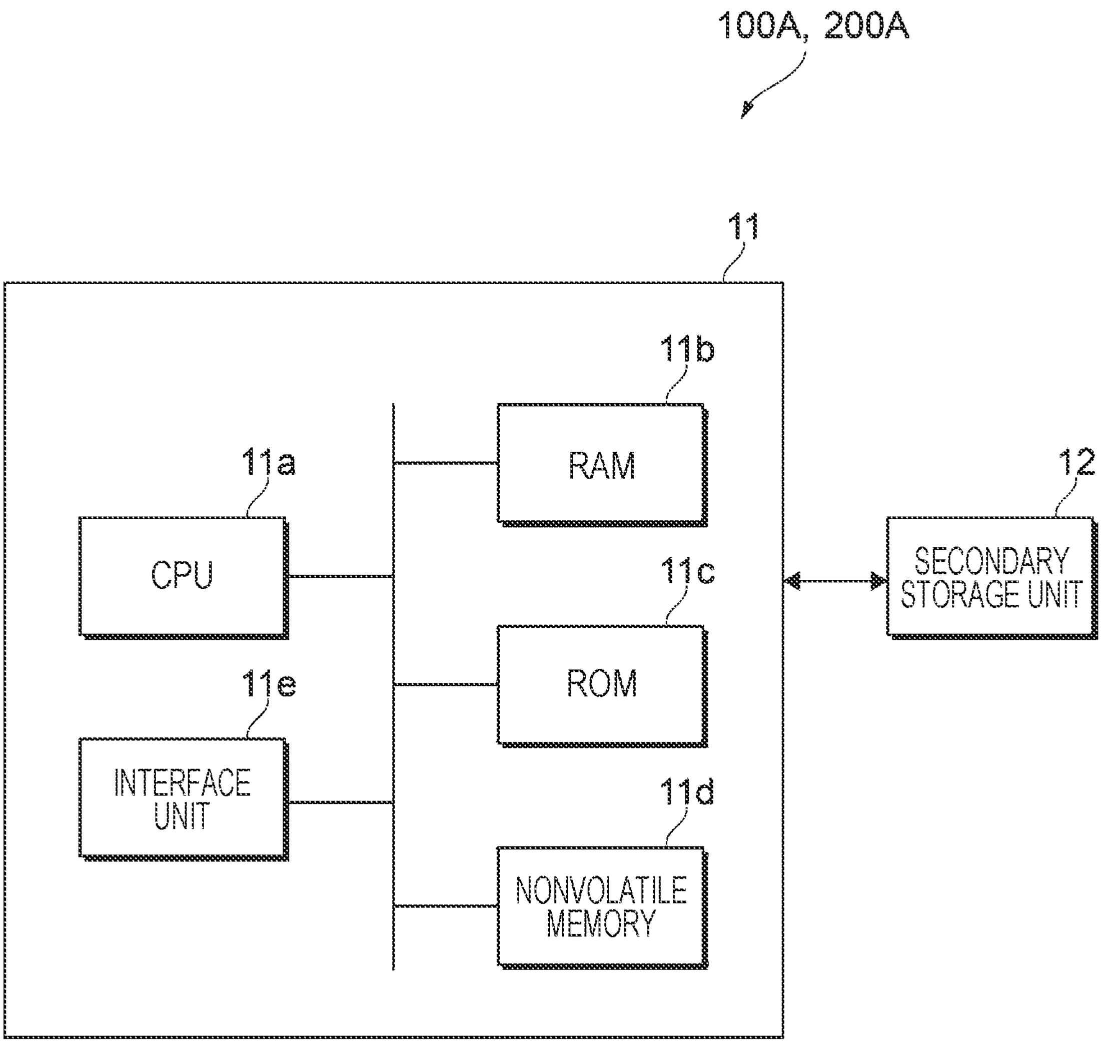
FIG. 2 illustrates a hardware configuration example of an information processing unit provided in an image forming apparatus and an information processing unit provided in a server apparatus.

FIG. 2 illustrates a hardware configuration example of the information processing unit 100A provided in the image forming apparatus 100 and the information processing unit 200A provided in the server apparatus 200. Each of the information processing units 100A and 200A is realized with a computer.

Each of the image forming apparatus 100 and the server apparatus 200 has an arithmetic processing unit 11 that executes a digital arithmetic process in accordance with a program, and a secondary storage unit 12 that stores information.

The secondary storage unit 12 is realized with an existing information storage device, such as an HDD, a semiconductor memory, or magnetic tape.

The arithmetic processing unit 11 is provided with a central processing unit (CPU) 11*a* as an example of a processor.

The arithmetic processing unit 11 is also provided with a random access memory (RAM) 11*b* used as a working memory for the CPU 11*a* and a read-only memory (ROM) 11*c* that stores a program to be executed by the CPU 11*a*.

The arithmetic processing unit 11 is further provided with a rewritable nonvolatile memory 11*d* capable of retaining data even when not supplied with electric power, and an interface unit 11*e* that controls each unit, such as a communication unit, connected to the arithmetic processing unit 11.

The nonvolatile memory 11*d* is constituted of, for example, a static random access memory (SRAM) or a flash memory backed up by a battery. In addition to a file, the secondary storage unit 12 stores a program to be executed by the arithmetic processing unit 11.

In this exemplary embodiment, the arithmetic processing unit 11 reads the programs stored in the ROM 11*c* and the secondary storage unit 12 so as to execute various processes.

The program to be executed by the CPU 11*a* may be provided to the information processing units 100A and 200A by being stored in a computer-readable storage medium, such as a magnetic storage medium (e.g., magnetic tape or a magnetic disk), an optical storage medium (e.g., an optical disk), a magneto-optical storage medium, or a semiconductor memory. Alternatively, the program to be executed by the CPU 11*a* may be provided to the information processing units 100A and 200A by using a communication unit, such as the Internet.

In this description, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

Furthermore, the term "processor" is broad enough to encompass one processor or plural processors in collaboration which are located physically apart from each other but may work cooperatively. The order of operations of the processor is not limited to one described in this exemplary embodiment, and may be changed.

Of processes to be described below, a process to be performed by the image forming apparatus 100 is performed by the CPU 11*a* as an example of a processor provided in the image forming apparatus 100.

Furthermore, of the processes to be described below, a process to be performed by the server apparatus 200 is performed by the CPU 11*a* as an example of a processor provided in the server apparatus 200.

An information processing system constituted of the image forming apparatus 100 may be realized with a single apparatus, such as a single image forming apparatus 100, or may be realized with multiple apparatuses.

Figure 3:
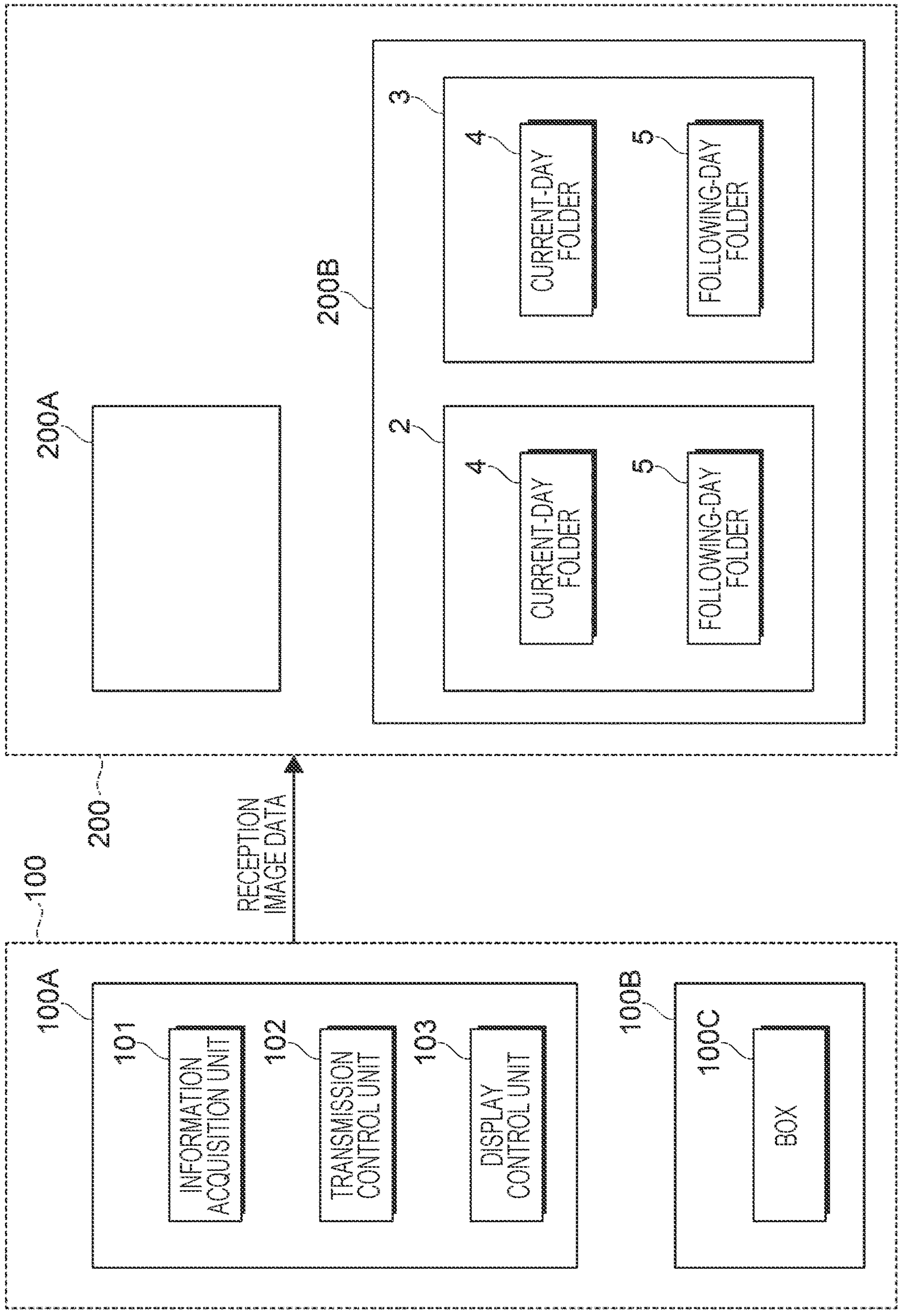
FIG. 3 is a block diagram illustrating a functional configuration of the image forming apparatus and the server apparatus.

FIG. 3 is a block diagram illustrating a functional configuration of the image forming apparatus 100 and the server apparatus 200.

As shown in FIG. 3, the information processing unit 100A of the image forming apparatus 100 has an information acquisition unit 101, a transmission control unit 102, and a display control unit 103.

The information acquisition unit 101 acquires various types of information, such as the reception image data and information about the reception time. The information acquisition unit 101 performs various processes related to the reception image data by using the acquired information.

The information acquisition unit 101 acquires information from the server apparatus 200 and the user terminal 300.

The transmission control unit 102 performs control for transmitting the various types of information acquired by the information acquisition unit 101 and results of the aforementioned processes to the server apparatus 200.

The display control unit 103 performs display control of the display device 310 of the user terminal 300 with respect to the server apparatus 200. The content of the display control is transmitted to the server apparatus 200 by the transmission control unit 102.

As shown in FIG. 3, the storage device 100B of the image forming apparatus 100 includes a box 100C including the aforementioned confidential box. For example, the reception image data is stored in the box 100C.

The storage device 200B of the server apparatus 200 has multiple folders. The multiple folders are created by the information processing unit 200A in response to a request from the image forming apparatus 100. For example, the multiple folders may include a folder for every date and a folder for every person-in-charge as a user of the user terminal 300.

The storage device 200B has the multiple folders created by the information processing unit 200A. The multiple folders may include a person-in-charge folder as a folder created for every person-in-charge and a date folder as a folder created for every date.

For example, the reception image data (see FIG. 1) is stored in a person-in-charge folder of a person-in-charge assigned in accordance with a predetermined condition. In this case, a date folder may be created in the person-in-charge folder and be used as a date folder for every reception date as the date of facsimile reception. The reception date may conceivably be included as a folder name of the date folder.

As shown in FIG. 3, in this exemplary embodiment, the storage device 200B has a first folder 2 and a second folder 3 as person-in-charge folders, and also has current-day folders 4 and following-day folders 5 as date folders.

The first folder 2 is a folder used by a person-in-charge T01 among multiple persons-in-charge, and has stored therein reception image data assigned to the person-in-charge T01. The second folder 3 is a folder used by a person-in-charge T02 different from the person-in-charge T01, and has stored therein reception image data assigned to the person-in-charge T02.

Of the date folders mentioned above, each current-day folder 4 is a date folder of the current day and includes the reception date of the current day with reference to a certain day in a folder name.

Each following-day folder 5 is a date folder of the following day and includes the reception date of the following day in a folder name.

As an alternative to this exemplary embodiment in which each of the first folder 2 and the second folder 3 includes a current-day folder 4 and a following-day folder 5, each of the first folder 2 and the second folder 3 may include a current-day folder 4 alone. If not including a following-day folder 5, each of the first folder 2 and the second folder 3 may include a folder for another purpose in place of the following-day folder 5.

In this exemplary embodiment, as shown in FIG. 3, the first folder 2 is provided with a current-day folder 4 and a following-day folder 5, and the second folder 3 is provided with a current-day folder 4 and a following-day folder 5.

Although not shown, a mode in which the current-day folder 4 is provided with a first folder 2 and a second folder 3 and in which the following-day folder 5 is provided with a first folder 2 and a second folder 3 may be employed.

Each of the multiple persons-in-charge using the user terminal 300 is responsible for work involving performing a predetermined process on reception image data (see FIG. 1) stored in the person-in-charge folder of the person-in-charge. The reception image data assigned to the person-in-charge is stored in the date folder within the person-in-charge folder of the person-in-charge. Furthermore, the person-in-charge processes the reception image data stored in the date folder of the current day within business hours of the current day.

A sorting destination as a person-in-charge folder of a person-in-charge to which newly received image data is assigned may be set based on, for example, the transmission source of the image data or information extracted from the image data, or may be assigned in sequence. These are examples of a predetermined condition.

When a certain person-in-charge performs work to finish processing the reception image data, assigned to the person-in-charge on the current day, within the business hours, if the image data assigned to the person-in-charge alone is received by the image forming apparatus 100 (see FIG. 3), the reception image data is additionally stored in the person-in-charge folder of the person-in-charge even if the reception image data is high in volume.

Even though the person-in-charge who has additionally stored the reception image data attempts to process the additionally-stored reception image data within the business hours, if the person-in-charge is not able to complete the process before a predetermined business end time point, the reception image data is not processable within the current day and is carried over to the following day onward. If overtime work is possible, the reception image data may be processed by working overtime, but this leads to an excessive workload of the person-in-charge. If the reception image data is still not processable by working overtime, the reception image data is not processable within the current day and is carried over to the following day onward, thus resulting in a processing delay.

In this exemplary embodiment, when the image forming apparatus 100 (see FIG. 3) receives image data, the number of items processable within the current day by a person-in-charge serving as a sorting destination is ascertained at a sorting stage for assigning the reception image data. Accordingly, the reception image data is sorted to the person-in-charge in a range not exceeding the number of items processable within the current day. For reception image data exceeding the number of items processable within the current day, the reception image data is sorted to a second person-in-charge as a candidate for a sorting destination within the range not exceeding the number of items processable within the current day. Consequently, a processing delay of the reception image data may be suppressed.

The server apparatus 200 is an example of a storage destination, the first folder 2, the second folder 3, the current-day folders 4, and the following-day folders 5 in the storage device 200B of the server apparatus 200 are examples of storage locations, and the folder names thereof are examples of information indicating the storage locations.

Furthermore, as an alternative to this exemplary embodiment in which the server apparatus 200 serves as a transfer destination, the storage device 100B of the image forming apparatus 100 may be set as a storage destination.

Figure 4:
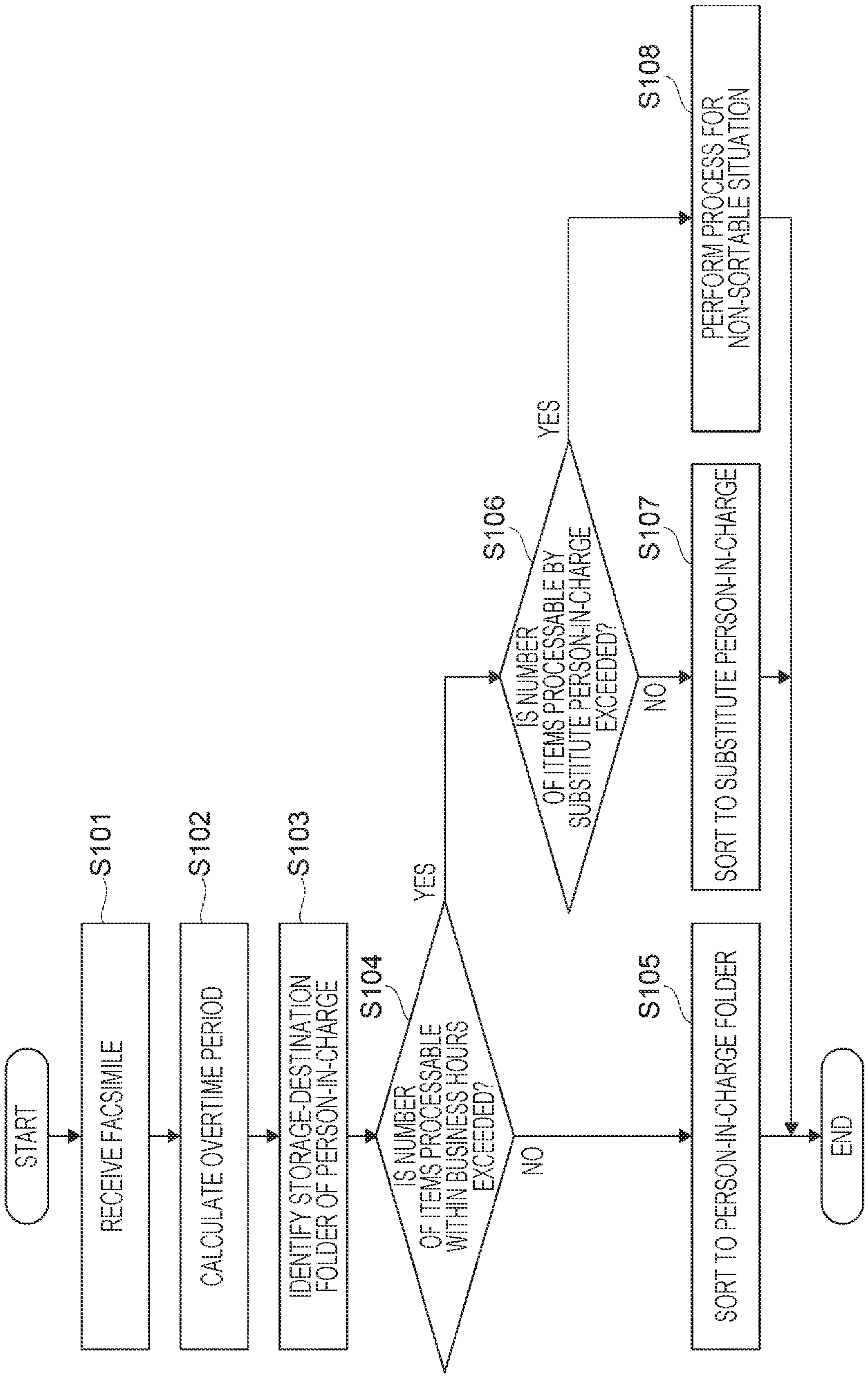
FIG. 4 is a flowchart illustrating a processing example in a central processing unit (CPU) of the information processing unit in the image forming apparatus according to a first exemplary embodiment.

FIG. 4 is a flowchart illustrating a processing example in the CPU 11*a* (see FIG. 2) of the information processing unit 100A in the image forming apparatus 100 according to this exemplary embodiment.

In the processing example shown in FIG. 4, if the image forming apparatus 100 receives a facsimile from the facsimile apparatus 400 (see FIG. 1) in step S101, the information acquisition unit 101 (see FIG. 3) of the CPU 11*a* stores acquired reception image data in the storage device 100B.

In step S102, the information acquisition unit 101 (see FIG. 3) calculates an overtime period as a time period to the end of work on the current day based on the current time point and the business end time point.

In step S103, the information acquisition unit 101 assigns newly-received image data (i.e., new reception image data) to a person-in-charge responsible for processing the new reception image data in accordance with a predetermined condition, and identifies a storage-destination folder from multiple person-in-charge folders. The following description relates to a case where the assigned person-in-charge is the person-in-charge T01, and the person-in-charge folder thereof is the first folder 2.

The predetermined condition refers to a condition for determining the person-in-charge responsible for processing the new reception image data. As one conceivable example, the assignment is performed in accordance with sequential numbers preliminarily given to multiple persons-in-charge. As another conceivable example, a facsimile transmission source and each person-in-charge are associated with each other in advance, and the assignment is performed in accordance with the transmission source.

If there are multiple items of reception image data received in one facsimile reception, the assignment is performed with respect to the multiple items of reception image data as a unit. Even when there is a single item of reception image data received in one facsimile reception, if there are multiple facsimile receptions from different transmission sources while the person-in-charge corresponding to the transmission sources is the same, the multiple items of reception image data may sometimes be assigned to a single person-in-charge.

The information acquisition unit 101 (see FIG. 3) checks the number of items of unprocessed reception image data in the first folder 2 as the person-in-charge folder of the person-in-charge T01 assigned in accordance with the predetermined condition. Moreover, the information acquisition unit 101 acquires information indicating a processing time period as a time period used for processing one item of reception image data, calculates a numerical value by dividing the processing time period by the calculated overtime period, and acquires the number of items processable within the current day. Then, in step S104, the information acquisition unit 101 compares the number of items of new reception image data with the number of items processable within the current day, so as to determine whether the number of items processable within the business hours by the assigned person-in-charge T01 is exceeded.

The number of items processable within the current day may be calculated at the time of facsimile reception, or may be calculated at predetermined time intervals. Conceivable examples of the predetermined time intervals include one-hour intervals and four-hour intervals.

The number of items processable within the current day is an example of a processable range within the current day.

With regard to the aforementioned processing time period, if the work involves a small variation among the persons-in-charge, a uniformly set time period may be used. If there is a large variation among the persons-in-charge, a time period set for each person-in-charge may be used.

More specifically, the time period set for each person-in-charge may be a difference between a time point at which reception image data is extracted and a time point at which next reception image data is extracted, or may be a difference between the start and the end of a process performed on reception image data. Moreover, the time period set for each person-in-charge may be a value input by a person-in-charge instead of an actual result value mentioned above.

If the difference is an actual result value, the value may be calculated and updated every time reception image data is extracted so as to be set as the most recent value.

In the case of a first time where there is no actual result value on the current day, a value input by a person-in-charge may be used, or a past average value to be described below may be used.

Furthermore, instead of being set as the most recent value, the time period set for each person-in-charge may be a value calculated as an average value on the current day or may be a value calculated as a past average value, such as an average value within a predetermined period in the past. The predetermined period is an example of past data serving as a processing time period per item of image data by a person-in-charge.

If the number of items processable within the business hours by the assigned person-in-charge T01 is not exceeded even when including the total number of items of new reception image data (No in step S104), the information acquisition unit 101 (see FIG. 3) sets the first folder 2 as a storage region so as to store the new reception image data in the first folder 2 of the assigned person-in-charge T01. Accordingly, in step S105, all the items of the new reception image data are sorted to the first folder 2 of the person-in-charge T01.

The information transmitted in step S105 described above and in step S107 to be described later may include the content of display control by the display control unit 103 (see FIG. 3).

If the number of items processable within the business hours by the assigned person-in-charge T01 is exceeded when including the total number of items of new reception image data (Yes in step S104), not all of the items of the new reception image data are assignable to the person-in-charge T01.

Therefore, since this situation is difficult to deal with by simply setting the person-in-charge T01 alone, a second person-in-charge is also to be set as an assigned person-in-charge. Specifically, as a substitute for the person-in-charge T01, a person-in-charge who is to process the remaining number of items as the number of items of new reception image data not processable on the current day by the person-in-charge T01 among the new reception image data is set. In detail, a person-in-charge as a substitute, that is, a substitute person-in-charge, for processing the remaining number of items is searched from the multiple persons-in-charge set in advance as candidates for the sorting destination. Instead of being multiple persons-in-charge mentioned above, a single person-in-charge may be a candidate for the sorting destination.

The result indicating No in step S104 includes a case where the person-in-charge T01 is unable to accept new reception image data at all.

Referring back to FIG. 4, the description will continue below.

The information acquisition unit 101 (see FIG. 3) determines in step S106 whether the number of processable items is exceeded when the remaining items are assigned to the substitute person-in-charge. The following description relates to a case where the person-in-charge T02 is the substitute person-in-charge.

If the number of items processable within the business hours by the substitute person-in-charge T02 is not exceeded even when including the remaining number of items (No in step S106), the information acquisition unit 101 (see FIG. 3) sets the second folder 3 as a storage region so as to store the reception image data in the second folder 3 of the substitute person-in-charge T02. Thus, in step S107, the remaining items of the new reception image data are sorted to the second folder 3 of the person-in-charge T02. Accordingly, in addition to the first folder 2 of the person-in-charge T01, the new reception image data may be sorted to the second folder 3 of the person-in-charge T02. The sorting destinations for the new reception image data may be set without preliminary adjustments between the persons-in-charge.

The substitute person-in-charge T02 is an example of a person not exceeding a processable range within the current day even when image data is added.

If the number of items processable within the business hours by the substitute person-in-charge T02 is exceeded when including the remaining number of items (Yes in step S106), in a case where the information acquisition unit 101 (see FIG. 3) has a difficulty in finding a person-in-charge other than the person-in-charge T02 or a person-in-charge other than the person-in-charge T02 is still unable to deal with the situation on the current day, non-sortable reception image data may exist. Therefore, a predetermined process is executed in step S108 as a process for when not all of the items of new reception image data are sortable.

The predetermined process in this case includes storing the image data in the following-day folder 5 (see FIG. 3) of the person-in-charge T01, providing an email notification indicating that cases difficult to deal with on the current day have occurred to a supervisor, such as a superior, supervising the person-in-charge T01, and displaying a report on the display device 310 of the user terminal 300 belonging to the superior.

Figure 5A:
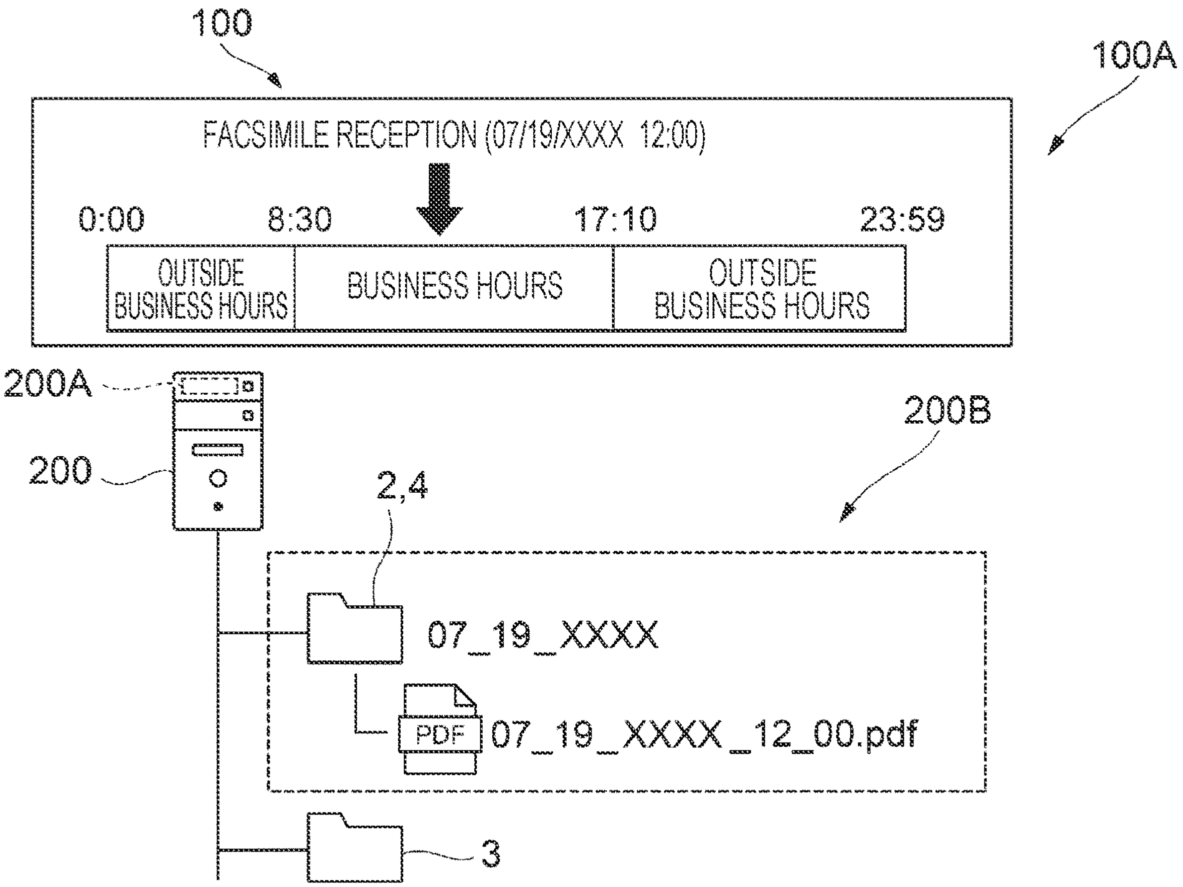
FIGS. 5A and 5B illustrate specific examples according to this exemplary embodiment, FIG. 5A illustrating a case where reception image data received by facsimile within business hours is assigned to a first person-in-charge, FIG. 5B illustrating a case where reception image data received by facsimile within the business hours is assigned to a second person-in-charge.
Figure 5B:
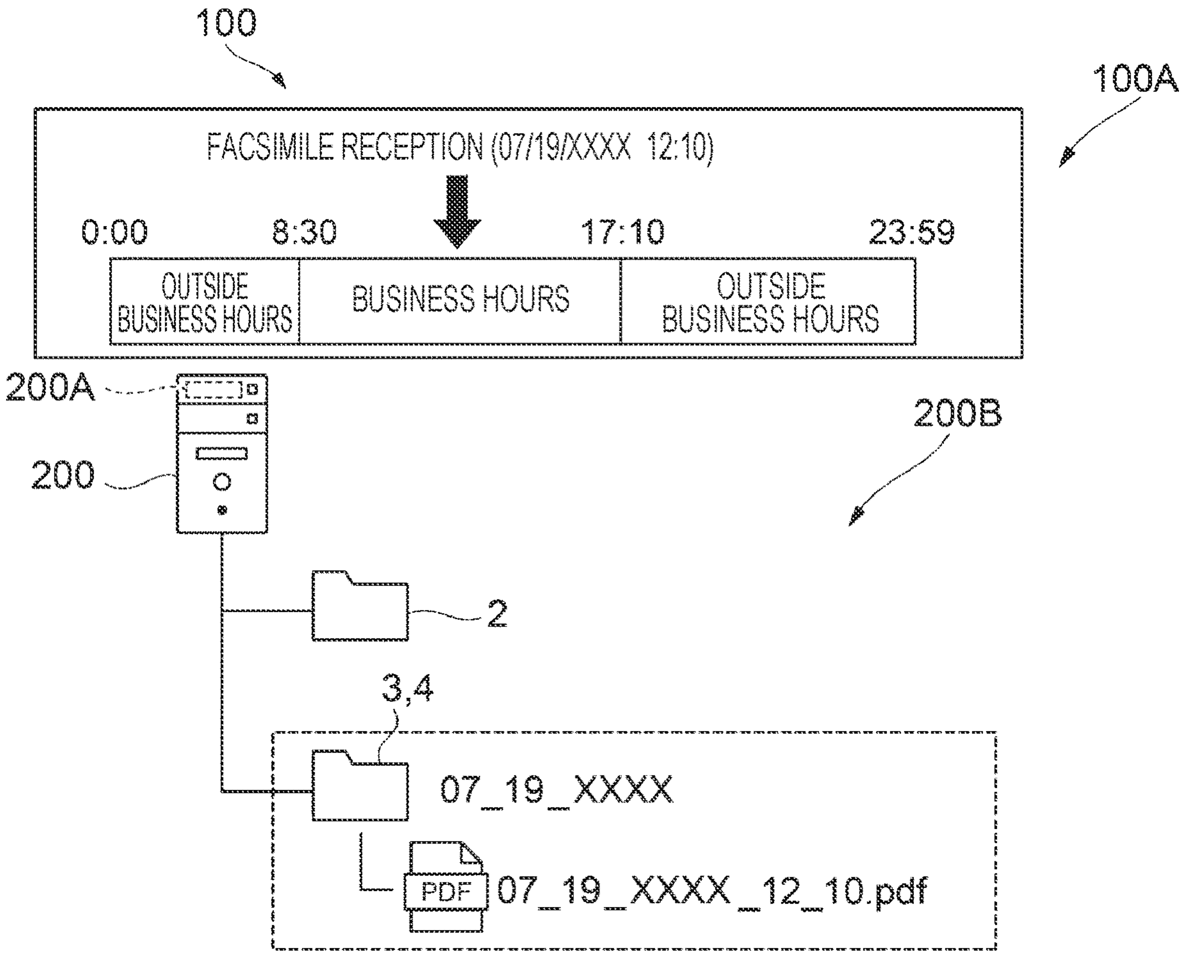
Figure 6:
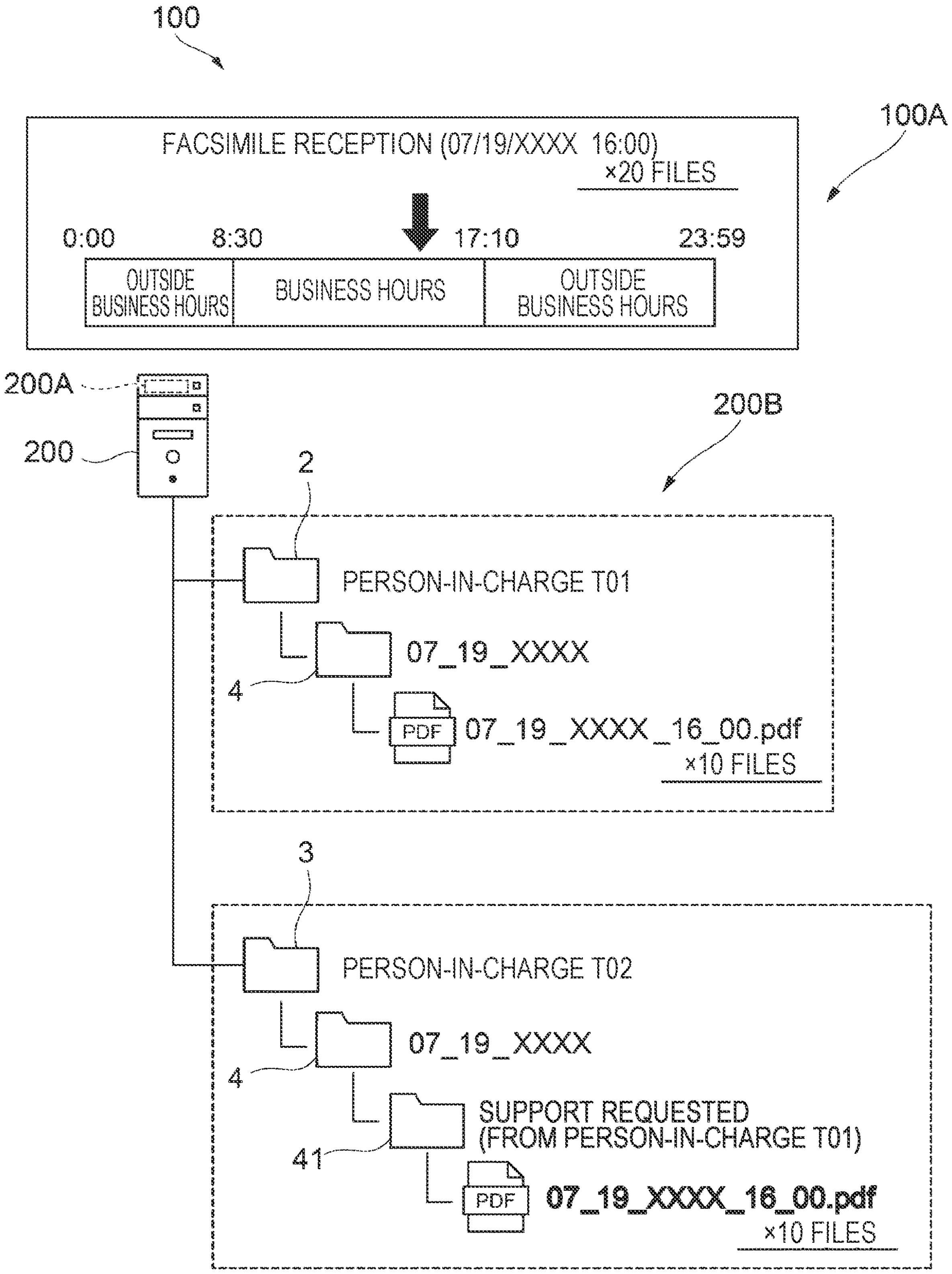
FIG. 6 illustrates a specific example according to this exemplary embodiment.

FIGS. 5A to 6 illustrate specific examples according to this exemplary embodiment. FIG. 5A illustrates a case where reception image data received by facsimile within the business hours is assigned to the person-in-charge T01, and FIG. 5B illustrates a case where reception image data received by facsimile within the business hours is assigned to the person-in-charge T02. FIG. 6 illustrates a case where the person-in-charge T02 is responsible for one or more of items of new reception image data assigned to the person-in-charge T01.

As shown in FIGS. 5A to 6, the business hours are from 8:30 to 17:10 in 24-hour notation.

Although FIGS. 5A to 6 are diagrams for explaining the image forming apparatus 100 and the server apparatus 200, a part indicating the file configuration within the storage device 200B of the server apparatus 200 may be regarded that the part indicates a mode of a screen displayed on the display device 310 (see FIG. 1) of the user terminal 300 from a different perspective.

In the case shown in FIG. 5A, the facsimile-reception time in the image forming apparatus 100 indicates 12:00 on July 19, XXXX, and the information processing unit 100A has set the first folder 2 of the person-in-charge T01 as a sorting destination for the reception image data. Therefore, when transferring the reception image data, the information acquisition unit 101 (see FIG. 3) transmits information indicating that the sorting destination is the person-in-charge T01 and information including time information of the current day to the server apparatus 200.

Each of the information indicating that the sorting destination is the person-in-charge T01 and the information including the time information of the current day is an example of information indicating a storage location.

When the server apparatus 200 receives the aforementioned information, the information processing unit 200A stores the transferred reception image data with a filename "XXXX_07_19_12_00.pdf" in a folder "XXXX_07_19" as the current-day folder 4 within the first folder 2 in the storage device 200B.

In the case shown in FIG. 5B, the facsimile-reception time indicates 12:10 on July 19, XXXX, and the information processing unit 100A has set the second folder 3 of the person-in-charge T02 as a sorting destination for the reception image data. Therefore, when transferring the reception image data, the information acquisition unit 101 (see FIG. 3) transmits information indicating that the sorting destination is the person-in-charge T02 and information including time information of the current day to the server apparatus 200.

Each of the information indicating that the sorting destination is the person-in-charge T02 and the information including the time information of the current day is an example of information indicating a storage location.

When the server apparatus 200 receives the aforementioned information, the information processing unit 200A stores the transferred reception image data with a filename "XXXX_07_19_12_10.pdf" in a folder "XXXX_07_19" as the current-day folder 4 within the second folder 3 in the storage device 200B.

In order to distinguish processed reception image data from unprocessed reception image data in the current-day folder 4, a conceivable workflow involves moving the files to different folders, changing the filenames thereof, and changing the properties of the files.

In the case shown in FIG. 6, a facsimile is received at 16:00 on July 19, XXXX, meaning that 1 hour and 10 minutes remain until the end of the business hours. As shown in FIG. 6, 20 files of new reception image data are received by facsimile, meaning that there are 20 items of new reception image data.

In this case, assuming that the number of items processable within the current day by the person-in-charge T01 at the time of facsimile reception is 10 files, the 10 files of the 20 files are not processable within the current day.

The information acquisition unit 101 (see FIG. 3) performs information processing to search for a second person-in-charge who is able to process the remaining 10 files in place of the person-in-charge T01. The number of items processable within the current day by the second person-in-charge T02 is, for example, 15 files. Thus, the person-in-charge T02 processes the remaining 10 files, thereby allowing for the processing within the current day.

When transferring the remaining 10 files, the information acquisition unit 101 (see FIG. 3) transmits, to the server apparatus 200, information indicating that the second folder 3 serving as a folder of the person-in-charge T02 is the storage location.

More specifically, in a case where the second folder 3 has the folder "XXXX_07_19" as the current-day folder 4, a folder "support requested (from person-in-charge T01)" within the folder "XXXX_07_19" is designated as information indicating the storage location for the remaining 10 files.

The filenames of the remaining 10 files are indicated with a bold font. The display mode using such a bold font indicates that a file is to be processed by a substitute.

Accordingly, the storage location for each of the remaining 10 files is given a folder name different from the usual, and each filename is indicated with a bold font. Specifically, the remaining 10 files are displayed in a mode different from the display mode for the reception image data originally assigned to the person-in-charge T02.

As an alternative to both giving a folder name different from the usual and indicating a filename with a bold font, the different mode may involve either giving a folder name different from the usual or indicating a filename with a bold font. Furthermore, as an alternative to or in addition to giving a folder name different from the usual and indicating a filename with a bold font, the folder name or the filename may be displayed in a high-profile color, such as red. Accordingly, this may serve as a reminder for the person-in-charge T02.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1))) An information processing apparatus comprising:
a processor configured to:
assign received image data to a person-in-charge in accordance with a predetermined condition, the person-in-charge processing the image data; and
transmit information indicating a storage location corresponding to the person-in-charge to a storage destination where the image data is stored if a processable range within a current day is not exceeded as a result of the assigning of the image data to the assigned person-in-charge, and transmit information indicating a storage location corresponding to a second person-in-charge different from the person-in-charge to the storage destination if the range is exceeded, the information indicating the storage location corresponding to the person-in-charge and the information indicating the storage location corresponding to the second person-in-charge each serving as information indicating a storage location in the storage destination when the image data is transferred to the storage destination.

(((2))) The information processing apparatus according to (((1))),
wherein the processable range within the current day is a numerical value obtained by dividing a time period to an end of work by the person-in-charge by past data serving as a processing time period per item of image data by the person-in-charge.

(((3))) The information processing apparatus according to (((2))),
wherein the past data is a difference at a time of extraction as a time point at which each item of stored image data is extracted from the storage location.

(((4))) The information processing apparatus according to (((2))),
wherein the past data is most recent data in a time period used for processing the image data.

(((5))) The information processing apparatus according to (((1))),
wherein the processable range within the current day is a numerical value obtained by dividing a time period to an end of work by the person-in-charge by a value input as a processing time period per item of image data by the person-in-charge.

(((6))) The information processing apparatus according to any one of (((1))) to (((5))),
wherein the processable range within the current day is calculated when the image data is received.

(((7))) The information processing apparatus according to any one of (((1))) to (((5))),
wherein the processable range within the current day is calculated at a predetermined time interval.

(((8))) The information processing apparatus according to any one of (((1))) to (((7))),
wherein the second person-in-charge is selected from a plurality of persons-in-charge.

(((9))) The information processing apparatus according to (((8))),
wherein the second person-in-charge is selected from the plurality of persons-in-charge identified in accordance with the predetermined condition, the selected second person-in-charge being a person not exceeding the processable range within the current day even when the image data is added.

(((10))) The information processing apparatus according to any one of (((1))) to (((9))),
wherein, when the information indicating the storage location corresponding to the second person-in-charge is transmitted to the storage destination, the image data is displayed in a mode different from a display mode for the image data according to the assigning.

(((11))) A program causing an information processing apparatus to execute a process, the process comprising:
assigning received image data to a person-in-charge in accordance with a predetermined condition, the person-in-charge processing the image data; and
transmitting information indicating a storage location corresponding to the person-in-charge to a storage destination where the image data is stored if a processable range within a current day is not exceeded as a result of the assigning of the image data to the assigned person-in-charge, and transmitting information indicating a storage location corresponding to a second person-in-charge different from the person-in-charge to the storage destination if the range is exceeded, the information indicating the storage location corresponding to the person-in-charge and the information indicating the storage location corresponding to the second person-in-charge each serving as information indicating a storage location in the storage destination when the image data is transferred to the storage destination.

What is claimed is:

1. An information processing apparatus comprising:
a processor configured to:
assign received image data to a person-in-charge in accordance with a predetermined condition, the person-in-charge processing the image data; and
transmit information indicating a storage location corresponding to the person-in-charge to a storage destination where the image data is stored if a processable range within a current day is not exceeded as a result of the assigning of the image data to the assigned person-in-charge, and transmit information indicating a storage location corresponding to a second person-in-charge different from the person-in-charge to the storage destination if the range is exceeded, the information indicating the storage location corresponding to the person-in-charge and the information indicating the storage location corresponding to the second person-in-charge each serving as information indicating a storage location in the storage destination when the image data is transferred to the storage destination.

2. The information processing apparatus according to claim 1, wherein the processable range within the current day is a number of items of image data processable by the person-in-charge within the current day, the number being obtained by dividing a time period from a current time point to an end of work of the person-in-charge by past data serving as a processing time period per item of image data by the person-in-charge.

3. The information processing apparatus according to claim 2, wherein the past data is a difference at a time of extraction as a time point at which each item of stored image data is extracted from the storage location.

4. The information processing apparatus according to claim 2, wherein the past data is most recent data in a time period used for processing the image data.

5. The information processing apparatus according to claim 1, wherein the processable range within the current day is a number of items of image data processable by the person-in-charge within the current day, the number being obtained by dividing a time period from a current time point to an end of work of the person-in-charge by a value input as a processing time period per item of image data by the person-in-charge.

6. The information processing apparatus according to claim 1, wherein the processable range within the current day is calculated when the image data is received.

7. The information processing apparatus according to claim 1, wherein the processable range within the current day is calculated at a predetermined time interval.

8. The information processing apparatus according to claim 1, wherein the second person-in-charge is selected from a plurality of persons-in-charge.

9. The information processing apparatus according to claim 8, wherein the second person-in-charge is selected from the plurality of persons-in-charge identified in accordance with the predetermined condition, the selected second person-in-charge being a person not exceeding the processable range within the current day even when the image data is added.

10. The information processing apparatus according to claim 1, wherein, when the information indicating the storage location corresponding to the second person-in-charge is transmitted to the storage destination, the image data is displayed in a mode different from a display mode for the image data according to the assigning.

11. A non-transitory computer readable medium storing a program causing an information processing apparatus to execute a process, the process comprising:

assigning received image data to a person-in-charge in accordance with a predetermined condition, the person-in-charge processing the image data; and transmitting information indicating a storage location corresponding to the person-in-charge to a storage destination where the image data is stored if a processable range within a current day is not exceeded as a result of the assigning of the image data to the assigned person-in-charge, and transmitting information indicating a storage location corresponding to a second person-in-charge different from the person-in-charge to the storage destination if the range is exceeded, the information indicating the storage location corresponding to the person-in-charge and the information indicating the storage location corresponding to the second person-in-charge each serving as information indicating a storage location in the storage destination when the image data is transferred to the storage destination.

12. An information processing method comprising:

assigning received image data to a person-in-charge in accordance with a predetermined condition, the person-in-charge processing the image data; and transmitting information indicating a storage location corresponding to the person-in-charge to a storage destination where the image data is stored if a processable range within a current day is not exceeded as a result of the assigning of the image data to the assigned person-in-charge, and transmitting information indicating a storage location corresponding to a second person-in-charge different from the person-in-charge to the storage destination if the range is exceeded, the information indicating the storage location corresponding to the person-in-charge and the information indicating the storage location corresponding to the second person-in-charge each serving as information indicating a storage location in the storage destination when the image data is transferred to the storage destination.

* * * * *